US012711318B2

(12) United States Patent
Hasan et al.

(10) Patent No.: US 12,711,318 B2
(45) Date of Patent: Aug. 18, 2026

(54) METHOD AND SYSTEM FOR GENERATING CONVERSATION FLOWS

(71) Applicants: Asif Hasan, Marlborough, MA (US); Gaurav Johar, Toronto (CA); Kanishk Mehta, Toronto (CA); Sreevasthavan K C, Mumbai (IN); Akash Mourya, Mumbai (IN); Himanshu Kumar, Mumbai (IN); Surya S G, Mumbai (IN); Harshit Shah, Mumbai (IN); Ashwini Patil, Mumbai (IN); Saravanan Murugan, Mumbai (IN); Anuja Anil Kumar Singh, Mumbai (IN); Tridib Paul, Mumbai (IN)

(72) Inventors: Asif Hasan, Marlborough, MA (US); Gaurav Johar, Toronto (CA); Kanishk Mehta, Toronto (CA); Sreevasthavan K C, Mumbai (IN); Akash Mourya, Mumbai (IN); Himanshu Kumar, Mumbai (IN); Surya S G, Mumbai (IN); Harshit Shah, Mumbai (IN); Ashwini Patil, Mumbai (IN); Saravanan Murugan, Mumbai (IN); Anuja Anil Kumar Singh, Mumbai (IN); Tridib Paul, Mumbai (IN)

(73) Assignee: QUANTIPHI INC., Marlborough, MA (US)

( * ) Notice: Subject to any disclaimer, the term of this patent is extended or adjusted under 35 U.S.C. 154(b) by 249 days.

(21) Appl. No.: 18/217,533

(22) Filed: Jul. 1, 2023

(65) Prior Publication Data

US 2023/0351121 A1 Nov. 2, 2023

(51) Int. Cl.
*G06F 40/40* (2020.01)
*G06F 16/31* (2019.01)
(Continued)

(52) U.S. Cl.
CPC ............ *G06F 40/40* (2020.01); *G06F 16/322* (2019.01); *G06F 16/3329* (2019.01); *G06F 16/355* (2019.01)

(58) Field of Classification Search
CPC .... G06F 40/40; G06F 16/322; G06F 16/3329; G06F 16/355; G06F 40/35
See application file for complete search history.

(56) References Cited

U.S. PATENT DOCUMENTS 10,498,898 B2 12/2019 Mazza et al.
11,074,416 B2 7/2021 Li et al.
(Continued)

FOREIGN PATENT DOCUMENTS

WO 2020068808 A1 4/2020

OTHER PUBLICATIONS

Mikael Lundell Vinkler,"Conversational Chatbots with Memory-based Question and Answer Generation", available at <https://www.diva-portal.org/smash/get/diva2:1510358/FULLTEXT01.pdf>Nov. 13, 2020, 132 pages.

*Primary Examiner* — Linda Wong
(74) *Attorney, Agent, or Firm* — D'Ambrosio & Menon, PLLC; Usha Menon

(57) ABSTRACT

A method and system for generating conversation flows is provided herein. The method and system comprise storing conversations between at least an agent and at least a user in logs. Further, the method and system comprise extracting topics from the logs. Also, the method and system comprise creating clusters from the extracted topics. The method and system further comprise generating the conversation flows from the clusters.

9 Claims, 7 Drawing Sheets

(51) Int. Cl.
*G06F 16/3329* (2025.01)
*G06F 16/355* (2025.01)

(56) References Cited

U.S. PATENT DOCUMENTS

| | | | | |
|---|---|---|---|---|
| 11,087,094 | B2 | 8/2021 | Chatterjee et al. | |
| 11,206,229 | B2 | 12/2021 | Singaraju et al. | |
| 2019/0182382 | A1* | 6/2019 | Mazza | H04M 3/527 |
| 2019/0325868 | A1* | 10/2019 | Lecue | G10L 25/63 |
| 2021/0043194 | A1* | 2/2021 | Krishnamurthy | G10L 15/22 |

* cited by examiner

FIG. 6

METHOD AND SYSTEM FOR GENERATING CONVERSATION FLOWS

TECHNICAL FIELD OF THE INVENTION

The present disclosure is related to method and system for generating conversation flows. More specifically, the disclosure relates to generating conversation flows using text transcripts of conversations between human agents and users to derive conversation flow designs for virtual agents.

BACKGROUND OF THE INVENTION

Conversational systems, such as virtual agents and chatbots, have become increasingly prevalent in various domains, including customer support, information retrieval, and task automation. The virtual agent refers to an interactive software program or system that simulates human-like conversations or interactions using artificial intelligence (AI) techniques. The virtual agent is designed to communicate with users in a natural language format, typically through text-based chat interfaces or voice-based interactions. The virtual agent is capable of understanding user queries or requests, interpreting the context, and providing appropriate responses or actions.

The virtual agent's functionality is based on advanced algorithms and AI models, which enables processing and analyzing user input, extracting relevant information, and generating meaningful and contextually appropriate responses. The virtual agent may utilize various techniques such as natural language processing (NLP), machine learning, pattern recognition, and knowledge representation to achieve accurate understanding and effective communication with users.

The virtual agent's capabilities may include but are not limited to:

Natural Language Understanding (NLU): The virtual agent is equipped with NLU algorithms to comprehend user intents, extract key information, and identify the context of the conversation.

Contextual Understanding: The virtual agent is capable of maintaining contextual awareness throughout the conversation, ensuring that responses are relevant and coherent within the ongoing dialogue.

Dialogue Management: The virtual agent utilizes sophisticated dialogue management techniques to maintain a coherent and engaging conversation flow, handling multiple turns and managing user expectations.

Knowledge Base Integration: The virtual agent can access and integrate with a knowledge base or database containing relevant information to provide accurate and up-to-date responses to user inquiries.

Personalization: The virtual agent may employ user profiling techniques to tailor responses based on individual preferences, past interactions, or demographic information.

Task Execution: The virtual agent may perform various tasks or actions on behalf of the user, such as retrieving information from external sources, making reservations, or initiating specific processes.

Therefore, the conversational systems provide efficient and effective interactions with users, simulating human-like conversations and delivering personalized responses. However, designing conversation flows that can accurately understand user inputs and generate appropriate responses poses significant challenges.

At present, the development of conversation flows for virtual agents has relied on manual analysis and design, which is time-consuming and prone to subjective biases. Moreover, the substantial amount of text transcripts generated from conversations between users and human agents poses a challenge in efficiently extracting valuable insights from the data in a timely manner.

To address these challenges, there is a need in the present state of art, for an automated method and system that may derive conversation flow designs from text transcripts of conversation logs, and may uncover underlying patterns, topics, and intents within the conversations, enabling a creation of more effective and engaging virtual agents.

It is within this context that the present embodiments arise.

SUMMARY

The following embodiments present a simplified summary in order to provide a basic understanding of some aspects of the disclosed invention. This summary is not an extensive overview, and it is not intended to identify key/critical elements or to delineate the scope thereof. Its sole purpose is to present some concepts in a simplified form as a prelude to the more detailed description that is presented later.

Some example embodiments disclosed herein provide a method for generating conversation flows, the method comprising storing conversations between at least an agent and at least a user in logs. The method may further include extracting topics from the logs. The method may include creating clusters from the extracted topics. The method may also include generating the conversation flows from the clusters.

According to some example embodiments, the conversation flows are modeled as a graph.

According to some example embodiments, the conversation flows are modeled using process mining.

According to some example embodiments, the graph is a directed cyclic graph.

According to some example embodiments, the topics are further classified as sub-topics and main topics.

According to some example embodiments, the sub-topics and the main topics are modeled as a tree.

According to some example embodiments, the method further comprising assigning generic names to the clusters.

According to some example embodiments, the generic names are the intent names.

According to some example embodiments, the agent is a human agent.

Some example embodiments disclosed herein provide a computer system for generating conversation flows, the computer system comprises one or more computer processors, one or more computer readable memories, one or more computer readable storage devices, and program instructions stored on the one or more computer readable storage devices for execution by the one or more computer processors via the one or more computer readable memories, the program instructions comprising storing conversations between at least an agent and at least a user in logs. The one or more processors are further configured to extracting topics from the logs. The one or more processors are configured to creating clusters from the extracted topics. The one or more processors are further configured to generating the conversation flows from the clusters.

Some example embodiments disclosed herein provide a non-transitory computer readable medium having stored thereon computer executable instruction which when executed by one or more processors, cause the one or more processors to carry out operations for generating conversation flows. The operations comprising storing conversations between at least an agent and at least a user in logs. The operations further comprising extracting topics from the logs. The operations further comprising creating clusters from the extracted topics. The operations further comprising generating the conversation flows from the clusters.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

The above and still further example embodiments of the present disclosure will become apparent upon consideration of the following detailed description of embodiments thereof, especially when taken in conjunction with the accompanying drawings, and wherein:

FIG. 6 illustrates an exemplary block diagram for classifying topics into main topic and sub-topics, in accordance with an example embodiment.

Figure 1:
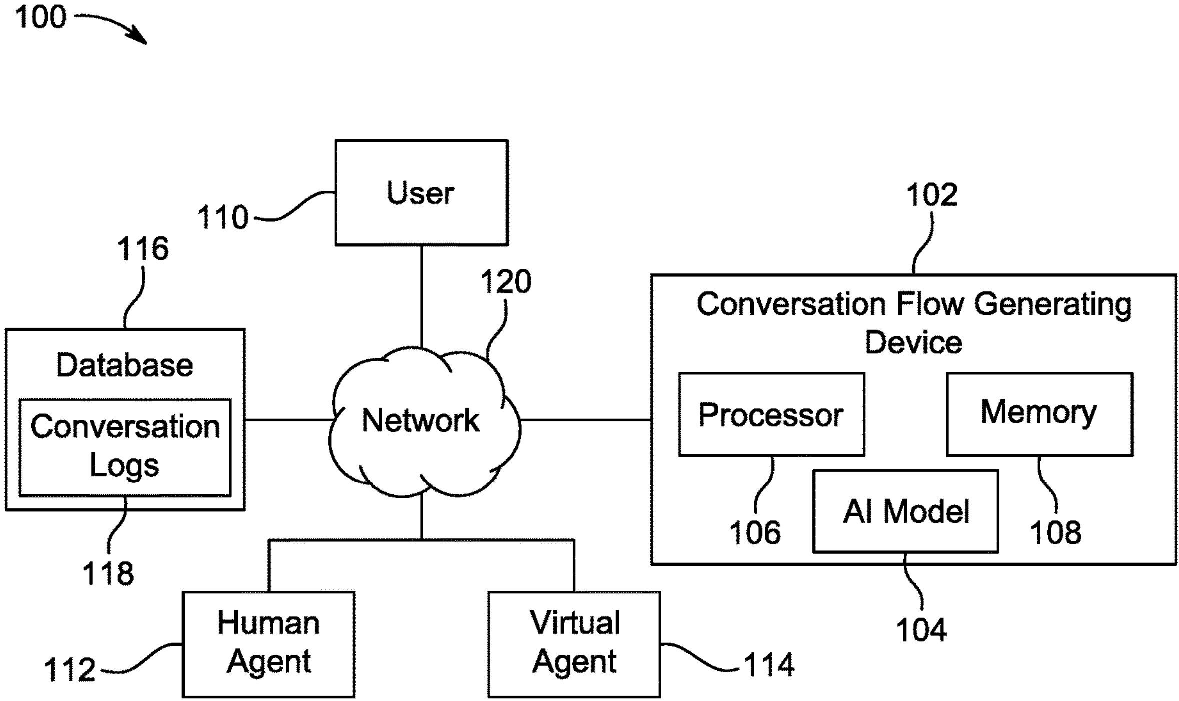
FIG. 1 illustrates a block diagram of a network environment of a system for generating conversation flows, in accordance with an example embodiment.

The figures illustrate embodiments of the invention for purposes of illustration only. One skilled in the art will readily recognize from the following description that alternative embodiments of the structures and methods illustrated herein may be employed without departing from the principles of the invention described herein.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, systems, apparatuses, and methods are shown in block diagram form only in order to avoid obscuring the present invention.

Reference in this specification to "one embodiment" or "an embodiment" or "example embodiment" means that a particular feature, structure, or characteristic described in connection with the embodiment is included in at least one embodiment of the present invention. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present disclosure will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout.

The terms "comprise", "comprising", "includes", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., are non-transitory. Examples include random access memory (RAM), read-only memory (ROM), volatile memory, non-volatile memory, hard drives, CD ROMs, DVDs, flash drives, disks, and any other known physical storage media.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present invention. Further, it is to be understood that the phraseology and terminology employed herein are for the purpose of the description and should not be regarded as limiting. Any heading utilized within this description is for convenience only and has no legal or limiting effect.

DEFINITIONS

The term "module" used herein may refer to a hardware processor including a Central Processing Unit (CPU), an Application-Specific Integrated Circuit (ASIC), an Application-Specific Instruction-Set Processor (ASIP), a Graphics Processing Unit (GPU), a Physics Processing Unit (PPU), a Digital Signal Processor (DSP), a Field Programmable Gate Array (FPGA), a Programmable Logic Device (PLD), a Controller, a Microcontroller unit, a Processor, a Microprocessor, an ARM, or the like, or any combination thereof.

The term "machine learning model" may be used to refer to a computational or statistical or mathematical model that is trained on classical ML modelling techniques with or without classical image processing. The "machine learning model" is trained over a set of data and using an algorithm that it may use to learn from the dataset.

The term "artificial intelligence" may be used to refer to a model built using simple or complex Neural Networks using deep learning techniques, natural language processing technique, and computer vision algorithms. Artificial intelligence model learns from the data and applies that learning to achieve specific pre-defined objectives.

The term "human agent" may be used to refer to a human operator or human representative, who interact directly with users in a conversational setting. They can be customer service representatives, support agents, or operators working in contact centers or similar environments and may engage in conversations with users, providing assistance, answering questions, resolving issues, and performing various tasks.

The term "virtual agent" may be used to refer to a virtual assistant that is computer program or AI system designed to simulate human-like conversations with users. They are typically powered by artificial intelligence and natural language processing technologies. The virtual agent can understand user inputs, generate appropriate responses, and perform specific tasks or provide information. They are often used in customer support, information retrieval, and other applications to provide automated and efficient conversational experiences.

END OF DEFINITIONS

Embodiments of the present disclosure may provide a method, a system, and a computer program product for training a virtual agent. The method, the system, and the computer program product for training a virtual agent are described with reference to FIG. 1 to FIG. 7 as detailed below.

FIG. 1 illustrates a block diagram of a network environment of a system 100 for generating conversation flows. The system 100 may include a conversation flow generating device 102, a user 110, a human agent 112, a virtual agent 114, and a database 116. The conversation flow generating device 102, the user 110, the human agent 112 and the virtual agent 114 may be communicatively coupled with each other via a network 120. In an embodiment, the conversation flow generating device 102 may be capable of utilizing text transcripts, such as conversation logs 118 between the user 110 and the human agent 112 in contact centers, to generate possible conversation flow design during a development of the virtual agent 114. Examples of the conversation flow generating device 102 may include, but are not limited to, a server, a desktop, a laptop, a notebook, a tablet, a smartphone, a mobile phone, an application server, or the like.

The network 120 may be wired, wireless, or any combination of wired and wireless communication networks, such as cellular, Wi-Fi, internet, local area networks, or the like. In one embodiment, the network 120 may include one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In an embodiment, the user 110 may engage in conversations with the human agent 112 through the network 120. The network 120 may act as a medium through which the user 110 and the human agent 112 may interact with each other. The medium for communication between the user 110 and the human agent 112 may be either in a form of voice or text. The user 110 may be, for example, a customer, client, or any other person seeking information or assistance through the system 100. The human agent 112 may be a person responsible for engaging in conversations with the user 108. The human agent 112 may be responsible to provide a real-time responses and assistance to address user queries or concerns.

The conversations between the user 110 and the human agent 112 may be logged and stored in the database 116. These conversation logs 118 may capture entire dialogue, including user queries and agent responses. The database 116 may serve as a repository of conversational data that may be analysed and processed to generate conversation flows. It should be noted that the conversation logs 118 stored in the database 116 is required to transformed into text transcripts for further processing.

The conversational flow generating device 102 may include an Artificial Intelligence (AI) model 104 which may further include various modules that enable the conversation flow generating device 102 to generate conversation flows. These modules are explained in detail in conjunction with FIG. 2. The AI model 104 may employ advanced computational techniques, such as language processing (NLP), machine learning, topic modeling, process mining and data analysis to analyse the conversation logs, extract topics, create clusters, and generate conversation flows. These techniques enable the system 100 to understand the content and structure of conversations, uncover patterns and relationships within the data, and automate the process of deriving conversation flow designs.

In a more elaborative way, in order to generate the conversational flows, the conversation flow generating device 102 in conjunction with the AI model 104 may initially analyse the conversation logs between the user 110 and the human agent 112 to extract topics from the logs. In particular, the conversation flow generating device 102 may employ topic modeling techniques to the conversation logs stored in the database 112. These techniques may analyse the text data to identify main topics and sub-topics discussed during the conversations.

The conversation flow generating device 102 in conjunction with the AI model 104 may further create clusters from the extracted topics. These clusters may group together the related topics, and thus allowing a more organized representation of the conversation content. This clustering process may help to identify patterns and relationships among the topics and facilitate a more organized structure for the generation of conversation flows.

Based on the extracted topic clusters, the conversation flow generating device 102 in conjunction with the AI model 104 may further generate the conversation flows. In some embodiments, the conversation flows may be modeled as a graph representation. In the graph representation, nodes may represent specific intents or topics, and edges may represent the flow between different intents. It should be noted that the conversation flows may be modeled using the process mining technique. The process mining technique may be applied to the conversation data to uncover patterns, dependencies, and relationships, which may then be incorporated into a directed cyclic graph representation of the conversation flows. The complete process followed by the system 100 is further explained in detail in conjunction with FIG. 2 to FIG. 5.

The conversation flow generating device 102 may further include a processor 106 and a memory 108, and. The term "memory" used herein may refer to any computer-readable storage medium, for example, volatile memory, random access memory (RAM), non-volatile memory, read only memory (ROM), or flash memory. The memory 108 may include a Random-Access Memory (RAM), a Read-Only Memory (ROM), a Complementary Metal Oxide Semiconductor Memory (CMOS), a magnetic surface memory, a Hard Disk Drive (HDD), a floppy disk, a magnetic tape, a disc (CD-ROM, DVD-ROM, etc.), a USB Flash Drive (UFD), or the like, or any combination thereof.

The term "processor" used herein may refer to a hardware processor including a Central Processing Unit (CPU), an Application-Specific Integrated Circuit (ASIC), an Application-Specific Instruction-Set Processor (ASIP), a Graphics Processing Unit (GPU), a Physics Processing Unit (PPU), a Digital Signal Processor (DSP), a Field Programmable Gate Array (FPGA), a Programmable Logic Device (PLD), a Controller, a Microcontroller unit, a Processor, a Microprocessor, an ARM, or the like, or any combination thereof.

The processor 106 may retrieve computer program code instructions that may be stored in the memory 108 for execution of the computer program code instructions. The processor 106 may be embodied in a number of different ways. For example, the processor 106 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 106 may include one or more processing cores configured to perform independently. A multi-core processor may enable multiprocessing within a single physical package. Additionally, or alternatively, the processor 106 may include one or more processors configured in tandem via the bus to enable independent execution of instructions, pipelining and/or multithreading.

Additionally, or alternatively, the processor 106 may include one or more processors capable of processing large volumes of workloads and operations to provide support for big data analysis. In an example embodiment, the processor 106 may be in communication with a memory 108 via a bus for passing information among components of the system 100.

As exemplarily illustrated in FIG. 1, the memory 108 may be configured to store instructions for execution by the processor 106. As such, whether configured by hardware or software methods, or by a combination thereof, the processor 106 may represent an entity (for example, physically embodied in circuitry) capable of performing operations according to an embodiment of the present invention while configured accordingly. Thus, for example, when the processor 106 is embodied as an ASIC, FPGA or the like, the processor 106 may be specifically configured hardware for conducting the operations described herein.

Alternatively, as another example, when the processor 106 is embodied as an executor of software instructions, the instructions may specifically configure the processor 106 to perform the algorithms and/or operations described herein when the instructions are executed. However, in some cases, the processor 106 may be a processor specific device (for example, a mobile terminal or a fixed computing device) configured to employ an embodiment of the present invention by further configuration of the processor 106 by instructions for performing the algorithms and/or operations described herein. The processor 106 may include, among other things, a clock, an arithmetic logic unit (ALU) and logic gates configured to support operation of the processor 106.

Figure 2:
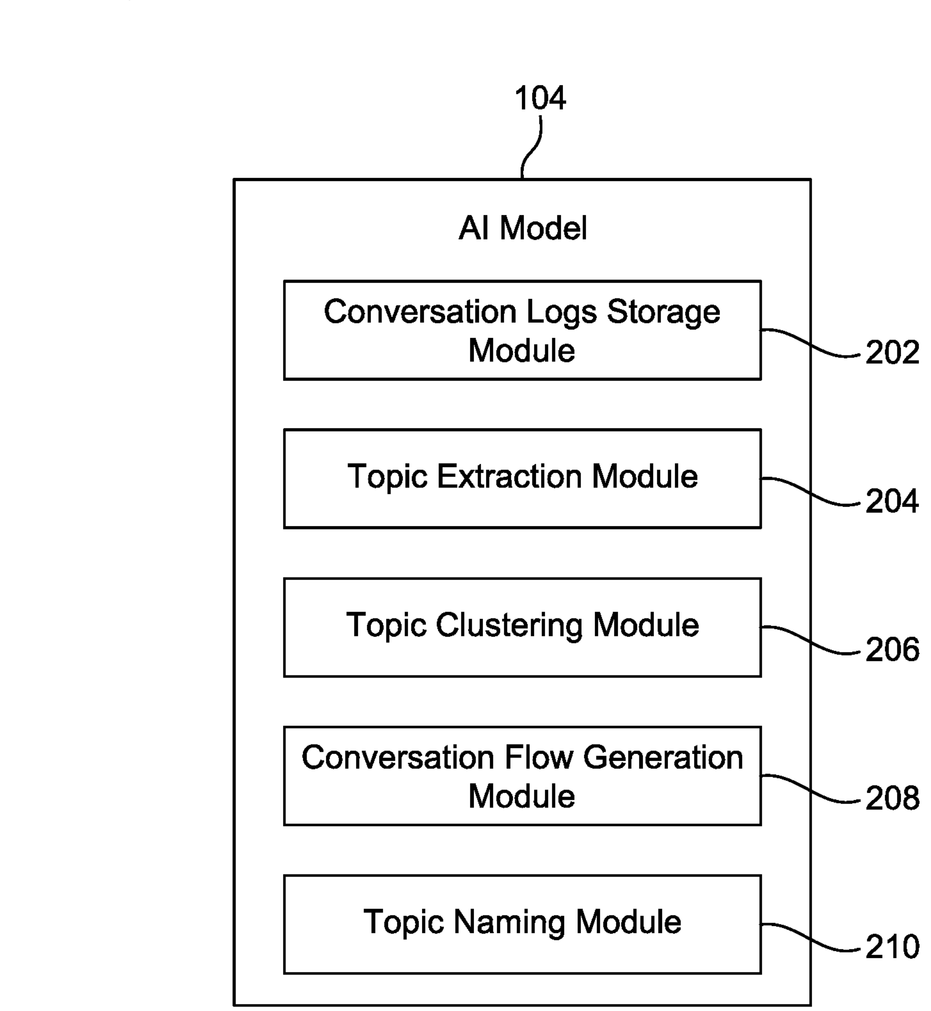
FIG. 2 illustrates a block diagram of various modules within an Artificial Intelligence (AI) model of a conversation flow generating device configured for generating conversation flows, in accordance with an example embodiment.

FIG. 2 illustrates a block diagram 200 of various modules within the AI model 104 of the conversation flow generating device 102 configured for generating conversation flows. The AI model 104 may include a conversation logs storage module 202, a topic mining module 204, a topic clustering module 206, a conversation flow generation module 208, and a topic naming module 210.

The conversation logs storage module 202 may be configured for storing the conversations between the human agent and the user in logs. These logs may act as the input data for further processing. For example, the conversation logs stored in the conversation logs storage module 202 as input may further be transformed into text transcripts.

Once the conversation logs are transformed into the text transcript, the topic mining module 204 may extract topics from the transcript of conversation logs. More particularly, the topic mining module 204 in conjunction with the AI model 104 may analyze the contents of logs and further classify the topics as sub-topics and main topics discussed within the conversations.

The extracted topics may further be organized into clusters through the topic clustering module 206. In particular, the topic clustering module 206 in conjunction with the AI model 104 may group the related topics together and may further create clusters that represent cohesive sets of conversation topics. In some embodiments, the topic clustering module 206 may be responsible for assigning generic names to the clusters. These generic names may act as possible intent name suggestions.

The conversation flow generation module 208 may be configured to generate the conversation flows based on the extracted topic clusters. More particularly, conversation flow generation module 208 in conjunction with AI model 104 may utilize clustering information to structure the order and arrangement of different intents and responses, resulting in an effective conversation flow design. Further, the conversation flow generation module facilitates process discovery and process mining. In some embodiments, the conversation flows may be modeled as a graph. The graph is a directed cyclic graph. In some embodiments, the topic naming module 210 may assign generic names to the clusters. These generic names may act as possible intent name suggestions.

In some embodiments, the generated directed cyclic graph, along with the identified topics and intent names, may act as a guide for developing the conversation flow of the virtual agent. The virtual agent's development team may use this information to program the virtual agent's behavior and responses. The virtual agent may then follow the conversation flow design derived from the text transcripts, enabling it to understand user inputs, determine the appropriate intents based on the identified topics, and generate relevant and appropriate responses.

In some example embodiments, directed cyclic graphs (DCGs) may be used in chat and virtual agent applications to model and represent complex conversational flows and dependencies. Here are a few ways DCGs may be employed:

Conversation Flow Control: DCGs may define the flow of a conversation by representing the different possible paths and transitions between chatbot responses. Each node in the graph represents a specific state or action, and the edges indicate the possible transitions between states. This allows for dynamic and flexible conversation management, enabling the chatbot to respond appropriately based on user input or context.

Contextual Understanding: DCGs may capture and maintain context throughout a conversation. By tracking the user's inputs, the chatbot's responses, and the current state of the conversation, DCGs may help ensure coherent and relevant interactions. Contextual understanding allows the chatbot to provide more personalized and accurate responses.

Intent Recognition and Routing: DCGs may be used to recognize user intents and route the conversation accordingly. Different branches or subgraphs within the DCG may represent various intents, such as requesting information, making a reservation, or providing feedback. The chatbot may identify the user's intent by analyzing their input and then follow the appropriate path in the DCG to handle that intent.

Multi-Turn Dialogues: DCGs excel at representing multi-turn dialogues where the chatbot needs to remember past interactions and maintain a coherent conversation flow. The cyclic nature of the graph allows the chatbot to loop back to previous states if necessary, ensuring a natural dialogue progression.

Error Handling and Repairs: DCGs may incorporate error handling and repairs in chatbot interactions. By anticipating potential errors or misunderstandings, the graph may include alternative paths or fallback strategies to handle such situations. When a user's input doesn't match any expected patterns or leads to an error, the chatbot may follow an error-handling subgraph to provide clarification or assistance.

Dynamic Content Generation: DCGs may facilitate the generation of dynamic content within chatbot responses. By incorporating variables, conditions, and branching logic, the graph may generate personalized and context-aware messages. For example, the chatbot may tailor responses based on user preferences, previous interactions, or external data.

In summary, DCGs provide a structured and visual representation of conversation flows, making it easier to design, understand, and maintain complex chatbot interactions. They enable chat and virtual agent applications to handle various scenarios, maintain context, and deliver engaging and effective conversations.

Figure 3:
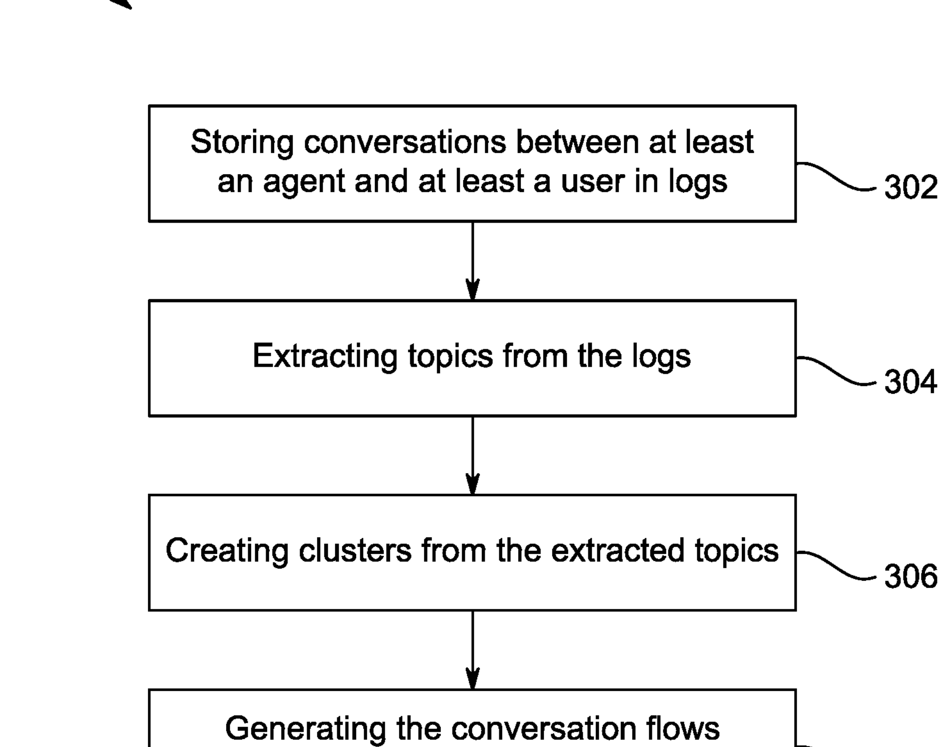
FIG. 3 shows a flow diagram of a method for generating conversation flows, in accordance with an example embodiment.

FIG. 3 shows a flow diagram of a method 300 for generating conversation flows. It will be understood that each block of the flow diagram of the method 300 may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 108 of the system 102, employing an embodiment of the present invention and executed by a processor 106. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram support combinations of means for performing the specified functions and combinations of operations for performing the specified functions for performing the specified functions. It will also be understood that one or more blocks of the flow diagram, and combinations of blocks in the flow diagram, may be implemented by special purpose hardware-based computer systems which perform the specified functions, or combinations of special purpose hardware and computer instructions. The method 300 illustrated by the flowchart diagram of FIG. 3 shows for generating conversation flows. Fewer, more, or different steps may be provided.

The method 300 illustrated by the flow diagram of FIG. 3 for generating conversation flows may include, at step 302, storing conversations between at least an agent and at least a user in logs. The agent may be a human agent. In some embodiments, the AI model 104 may be configured to record the dialogue between the human agent 112 and the user 110 in a structured format, typically in a log or a database (for example, the database 114), to save the conversational data for further processing (for example, for analyzing the text transcripts of conversation logs between the user 110 and human agent 112).

The method 300, at step 302, may include extracting topics from the logs. In this step, the method 300 may analyse the conversation logs to identify and extract the main topics that were discussed during the interactions. In some embodiments, the AI model 104 may classify the extracted topics into sub-topics and main topics. A method of classifying topics is explained in conjunction with FIG. 4.

The method 300, at step 304, may include creating clusters from the extracted topics. In other words, once the topics are extracted, the AI model 104 may further group them together into clusters based on their similarity. This clustering process helps to organize the topics into more structured representation of the conversation content. The clusters may provide a high-level categorization of the conversation topics.

As will be appreciated by those skilled in the art, the process of clustering may be performed by any of the well-known techniques, such as but not limited to, K-means clustering, hierarchical clustering, mean shift clustering, and the like.

In some example embodiments, clustering is an effective technique for processing conversation logs, providing valuable insights and facilitating various tasks. Mentioned below are techniques where clustering may be used in the context of conversation log processing:

Conversation Segmentation: Clustering may help identify distinct conversation segments within logs. By grouping together consecutive messages or turns based on their similarity in content or context, clustering algorithms may partition the log into meaningful segments. This segmentation may aid in organizing and structuring the log data, enabling better analysis and understanding of the conversations.

User Behavior Analysis: Clustering may be applied to analyze user behavior patterns within conversation logs. By clustering user interactions, such as message types, frequencies, or session durations, it becomes possible to identify different user behavior profiles or personas. This information may be valuable for user segmentation, personalized recommendations, or targeted marketing strategies.

Intent Identification: Clustering may assist in identifying different intents or purposes within conversation logs. By clustering user utterances based on their semantic similarity or topic, it becomes possible to categorize conversations into different intent clusters. This may help in understanding user needs, improving intent recognition models, and tailoring responses based on identified intents.

Anomaly Detection: Clustering may be utilized to detect anomalous or unusual conversation patterns within logs. By clustering conversations based on various features, such as message length, sentiment, or response time, deviations from the normal patterns may be identified. Anomaly detection may be beneficial in detecting fraudulent activities, abnormal user behavior, or system errors.

Knowledge Discovery: Clustering may facilitate knowledge discovery from conversation logs. By clustering conversations or messages based on their content, it becomes possible to identify common topics, emerging trends, or frequently discussed issues. This knowledge may be used for content generation, identifying training data for chatbots, or improving customer support processes.

Chatbot Improvement: Clustering may assist in enhancing chatbot performance and user experience. By clustering user feedback or evaluation data regarding the chatbot's responses, strengths, and weaknesses, it becomes possible to identify areas for improvement. Clustering may help in identifying specific issues or patterns that need attention, leading to better training and fine-tuning of chatbot models.

In summary, clustering conversation logs helps in organizing, understanding, and extracting valuable insights from the vast amounts of conversational data. It enables user behavior analysis, intent identification, anomaly detection, knowledge discovery, and improvements in chatbot systems. The insights gained from clustering may contribute to enhancing user satisfaction, optimizing chatbot performance, and improving overall conversational experiences.

Furthermore, the method 300, at step 306, may include generating the conversation flows from the clusters. In some embodiments, the generated conversation flows may be modeled as a graph. The graph may be a directed cyclic graph. The conversation flows may be modeled using a process mining. In a more elaborative way, the process mining technique may be employed on the conversation logs, relationships, and dependencies within the dataset. By applying the process mining technique, the AI model 104 may analyze the conversation logs to identify patterns and derive valuable information about how the conversation flows may develop.

In some example embodiments, a computer programmable product may be provided. The computer programmable product may comprise at least one non-transitory computer-readable storage medium having stored thereon computer-executable program code instructions that when executed by a computer, cause the computer to execute the method 300.

In an example embodiment, an apparatus for performing the method 300 of FIG. 3 above may comprise a processor (e.g., the processor 106) configured to perform some or each of the operations of the method 300. The processor may, for example, be configured to perform the operations 302-308 by performing hardware implemented logical functions, executing stored instructions, or executing algorithms for performing each of the operations. Alternatively, the apparatus may comprise means for performing each of the operations described above. In this regard, according to an example embodiment, examples of means for performing operations (302-308) may comprise, for example, the processor 106 which may be implemented in the system and/or a device or circuit for executing instructions or executing an algorithm for processing information as described above.

Figure 4:
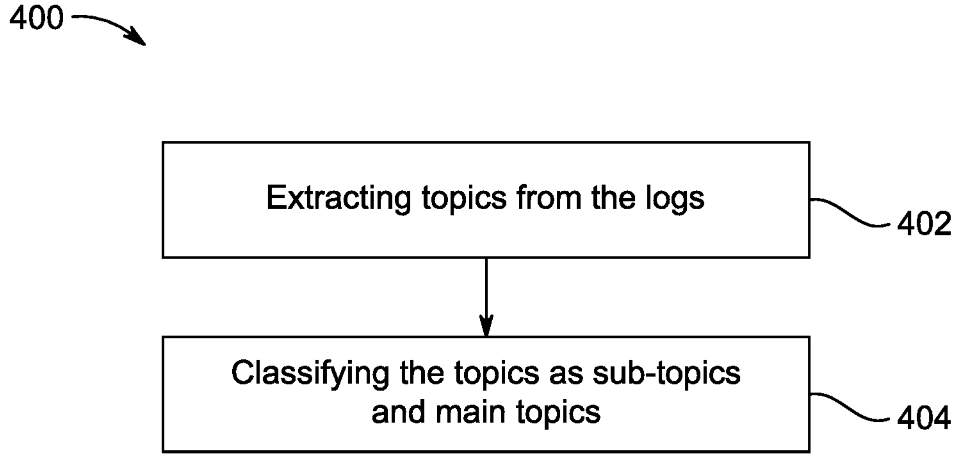
FIG. 4 shows a flow diagram of a method for classifying topics, in accordance with an example embodiment.

FIG. 4 shows a flow diagram of a method 400 for classifying topics, in accordance with an example embodiment. It will be understood that each block of the flow diagram of the method 400 may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 108 of the system 102, employing an embodiment of the present invention and executed by a processor 106. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram support combinations of means for performing the specified functions and combinations of operations for performing the specified functions for performing the specified functions. It will also be understood that one or more blocks of the flow diagram, and combinations of blocks in the flow diagram, may be implemented by special purpose hardware-based computer systems which perform the specified functions, or combinations of special purpose hardware and computer instructions. The method 300 illustrated by the flowchart diagram of FIG. 4 shows for for classifying topics. Fewer, more, or different steps may be provided.

As mentioned above in reference to FIG. 3, once the conversations between at least an agent and at least a user get stored in logs. Further, the method 400 of FIG. 4 may start with extracting topics from the logs, at step 402.

The method 400 may further include classifying the extracted topics as sub-topics and main topics, at step 404. In particular, by employing the AI techniques (for example, NLP or topic modeling) to the text transcripts, the AI model 104 may classify topics as main topics and sub-topics. The sub-topics and main topics may be modeled as a tree structure. For example, if the conversations is related to product issues, billing inquiries, or account management, the topic modeling technique may identify these as distinct topics. An exemplary block diagram for classifying topics into main topic and sub-topics is illustrated via FIG. 6.

The AI techniques may be employed to train models that can automatically classify text into different topic categories based on labeled training data. These machine learning models may then be used to classify the text transcripts into main topics and sub-topics.

In some example embodiments, there are several AI techniques commonly used for text classification based on labeled training data. Mentioned below are some of the example embodiments:

Naive Bayes: Naive Bayes is a probabilistic classification algorithm that works well for text classification tasks. It calculates the probability of a document belonging to a particular class based on the frequencies of words or features present in the document. Despite its assumption of independence between features, Naive Bayes often performs surprisingly well and is computationally efficient.

Support Vector Machines (SVM): SVM is a popular machine learning algorithm that can be used for text classification. It aims to find a hyperplane that maximally separates different classes in a high-dimensional feature space. SVM can handle both linear and non-linear classification tasks by using different kernel functions.

Logistic Regression: Logistic Regression is another commonly used algorithm for text classification. It models the relationship between the text features and the target classes using a logistic function, which maps the input features to probabilities. Logistic Regression is relatively simple, interpretable, and performs well in many text classification scenarios.

Random Forest: Random Forest is an ensemble learning technique that combines multiple decision trees to make predictions. Each decision tree is trained on a random subset of the training data and features. Random Forest can handle high-dimensional data and capture complex relationships between features and classes, making it suitable for text classification tasks.

Gradient Boosting: Gradient Boosting algorithms, such as XGBoost and LightGBM, are powerful techniques for text classification. They build an ensemble of weak prediction models in a sequential manner, with each subsequent model focusing on correcting the mistakes of the previous ones. Gradient Boosting algorithms often achieve excellent performance in text classification by effectively capturing intricate patterns in the data.

Deep Learning Models: Deep learning models, such as Convolutional Neural Networks (CNNs) and Recurrent Neural Networks (RNNs), have achieved remarkable success in text classification tasks. CNNs are effective at capturing local patterns in text data, while RNNs, such as Long Short-Term Memory (LSTM) networks, can handle sequential dependencies and capture contextual information. These models excel when ample labeled training data is available.

Transformer Models: Transformer models, like the renowned BERT (Bidirectional Encoder Representations from Transformers), have revolutionized text classification tasks. These models leverage attention mechanisms and pre-training on large-scale unlabeled data to learn rich contextual representations of words and sentences. Fine-tuning these models on task-specific labeled data can yield state-of-the-art performance in text classification.

In an embodiment, clustering algorithms may be effectively used for topic modeling, providing a valuable approach to extract and identify latent topics within a collection of documents.

The process of using clustering algorithms for topic modeling typically involves the following steps. First, the textual data is preprocessed to remove noise, such as stop words, punctuation, and irrelevant characters. Next, a document-term matrix is constructed, where each document is represented by a vector that captures the frequency or presence of each term in the corpus. This matrix serves as input for the clustering algorithm.

One popular clustering algorithm used for topic modeling is the K-means algorithm. K-means aims to partition the data into a predetermined number of clusters, where each cluster is represented by a centroid. In the context of topic modeling, K-means can be employed to group documents based on their similarity in terms of word usage.

To apply K-means for topic modeling, the document-term matrix is fed into the algorithm, and the number of desired clusters (topics) is specified. K-means then iteratively assigns documents to clusters based on the similarity of their term vectors and recalculates the centroids. The process continues until convergence, with the final result being a set of clusters where documents within each cluster are relatively similar to each other in terms of their word distribution.

After clustering, one may inspect the contents of the documents within each cluster to interpret and label the discovered topics. By analyzing the most frequent terms in each cluster, it is possible to identify the main themes or subjects that the documents within the cluster represent. This process of manual inspection and interpretation is crucial for understanding and labeling the topics derived from the clustering algorithm.

In addition to K-means, other clustering algorithms such as hierarchical clustering and density-based clustering can also be applied to topic modeling tasks. Hierarchical clustering creates a dendrogram that hierarchically organizes documents into clusters, enabling the exploration of both broad and fine-grained topics. Density-based clustering, as exemplified by DBSCAN, can uncover clusters of varying shapes and sizes, potentially revealing topics that are not well-separated or have varying densities within the document collection.

In conclusion, clustering algorithms offer a valuable approach for topic modeling by grouping similar documents together and extracting latent topics from textual data. They provide an automated and scalable solution for discovering and organizing themes within large document collections.

By combining clustering algorithms with manual interpretation and analysis, researchers and practitioners can gain valuable insights into the underlying topics and structure of textual data, supporting tasks such as document categorization, trend analysis, and recommendation systems.

The NLP techniques may be helpful in categorizing text into predefined categories or classes based on its content. For example, in this disclosure the NLP techniques may be utilized to analyse and process the text transcripts of conversations.

In some example embodiments, there are several NLP techniques that can be helpful in categorizing text into predefined categories or classes based on its content. Below mentioned are some example embodiments:

Bag-of-Words (BoW) Representation: BoW is a simple yet effective technique that represents text as a collection of words or tokens. It creates a vector representation of a document by counting the occurrences of words within it. These word frequency vectors can then be used as input to various classification algorithms, such as Naive Bayes, SVM, or logistic regression.

Term Frequency-Inverse Document Frequency (TF-IDF): TF-IDF is a weighting scheme that measures the importance of words in a document relative to a corpus of documents. It assigns higher weights to terms that appear frequently within a document but are less common in the overall corpus. TF-IDF can be used to transform text data into numerical vectors that capture the content-based characteristics of documents for classification.

Word Embeddings: Word embeddings, such as Word2Vec, GloVe, or FastText, represent words as dense, low-dimensional vectors that capture semantic relationships between words. These pre-trained word embeddings can be used to convert text into continuous vector representations. Document-level representations can be obtained by averaging or concatenating word embeddings. These representations are then fed into classification algorithms to categorize text.

Pre-trained Language Models: Pre-trained language models, such as BERT, GPT, or RoBERTa, have revolutionized NLP tasks, including text classification. These models are trained on large-scale corpora and can be fine-tuned on task-specific data. They capture contextual information and can generate powerful representations for text. By feeding the input text to a pre-trained model and extracting relevant features or utilizing the model's outputs, text classification can be performed with high accuracy.

Topic Modeling: Topic modeling techniques, such as Latent Dirichlet Allocation (LDA), are useful for identifying underlying topics or themes within a collection of documents. LDA represents documents as mixtures of topics and assigns probabilities to each topic for each document. This probabilistic representation can be used to categorize new documents into predefined topic categories.

Neural Networks: Deep learning architectures, such as Convolutional Neural Networks (CNNs) and Recurrent Neural Networks (RNNs), can be employed for text classification. CNNs are effective at capturing local patterns and features, while RNNs, such as LSTM or GRU, can handle sequential dependencies and capture long-term dependencies in text data. These architectures can learn complex representations and achieve high accuracy in text classification tasks.

Rule-Based Approaches: Rule-based approaches involve manually defining a set of rules or patterns to classify text based on specific keywords, patterns, or linguistic features. These rules can be based on domain knowledge, regular expressions, or heuristics. Rule-based approaches are often used in combination with other techniques to improve classification accuracy or handle specific requirements.

The choice of technique depends on factors such as the available labeled data, the complexity of the classification task, the size of the dataset, and the required performance. It is common to experiment with multiple techniques and choose the one that best suits the specific text categorization problem at hand.

In summary, topic modeling techniques may be utilized to automatically detect topics within the text transcripts. These techniques may cluster words and identify the main topics and sub-topics discussed in the conversations.

In some example embodiments, a computer programmable product may be provided. The computer programmable product may comprise at least one non-transitory computer-readable storage medium having stored thereon computer-executable program code instructions that when executed by a computer, cause the computer to execute the method 400.

In an example embodiment, an apparatus for performing the method 400 of FIG. 4 above may comprise a processor (e.g., the processor 106) configured to perform some or each of the operations of the method 400. The processor may, for example, be configured to perform the operations 402-404 by performing hardware implemented logical functions, executing stored instructions, or executing algorithms for performing each of the operations. Alternatively, the apparatus may comprise means for performing each of the operations described above. In this regard, according to an example embodiment, examples of means for performing operations (402-404) may comprise, for example, the processor 106 which may be implemented in the system and/or a device or circuit for executing instructions or executing an algorithm for processing information as described above.

Figure 5:
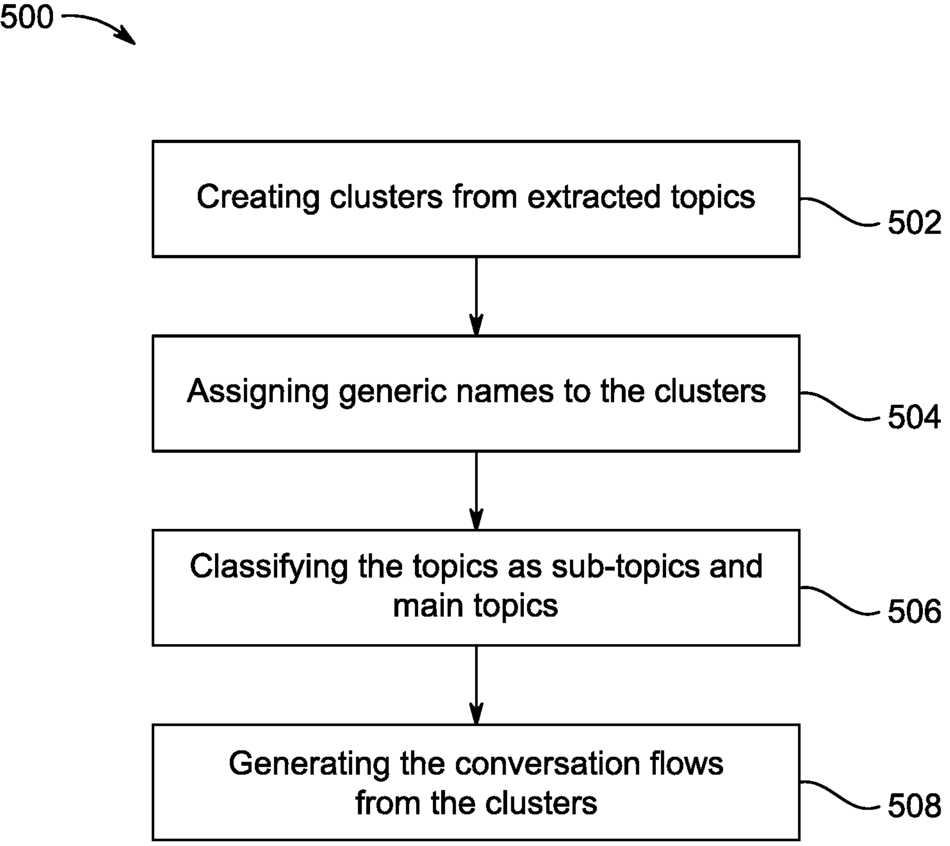
FIG. 5 shows another flow diagram of a method for generating conversation flows, in accordance with an example embodiment.

FIG. 5 shows another flow gram of a method 500 for generating conversation flows, in accordance with an example embodiment. It will be understood that each block of the flow diagram of the method 500 may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 108 of the system 102, employing an embodiment of the present invention and executed by a processor 106. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram support combinations of means for performing the specified functions and combinations of operations for performing the specified functions for performing the specified functions. It will also be understood that one or more blocks of the flow diagram, and combinations of blocks in the flow diagram, may be implemented by special purpose hardware-based computer systems which perform the specified functions, or combinations of special purpose hardware and computer instructions. The method 500 illustrated by the flowchart diagram of FIG. 5 shows for generating conversation flows. Fewer, more, or different steps may be provided.

The method 500, at step 502, may include creating clusters from the extracted topics. In other words, once the topics are extracted, the AI model 104 may further group them together into clusters based on their similarity.

Once the dusters are created, the method 500, at step 504, may include assigning generic names to the clusters. These generic names may act as possible intent name suggestions. The intent names may represent the intentions or purposes behind user queries related to the extracted topics. For example, in case if the duster relates to billing inquiries, then a possible intent name may be 'Billing. Inquiry'.

The method 500, at step 506, may include classifying the topics as sub-topics and main topics. By classifying topics as sub-topics and main topics, a structured representation of the conversation content may be achieved, capturing both the broad themes (main topics) and more specific details (sub-topics). This hierarchical approach may help in organizing and understanding the content of the conversations, enabling more effective analysis and development of conversation flows.

The method 500, at step 508, may include generating the conversation flows from the clusters. Therefore, the generated conversation flows may derive the sequence and structure of interactions between the virtual agent and the user based on the classified and identified clusters of topics. An exemplary block diagram of a conversation flows generated from main topic and sub-topics is illustrated via FIG. 7.

In some example embodiments, a computer programmable product may be provided. The computer programmable product may comprise at least one non-transitory computer-readable storage medium having stored thereon computer-executable program code instructions that when executed by a computer, cause the computer to execute the method 300.

In an example embodiment, an apparatus for performing the method 500 of FIG. 5 above may comprise a processor (e.g., the processor 106) configured to perform some or each of the operations of the method 500. The processor may, for example, be configured to perform the operations 502-508 by performing hardware implemented logical functions, executing stored instructions, or executing algorithms for performing each of the operations. Alternatively, the apparatus may comprise means for performing each of the operations described above. In this regard, according to an example embodiment, examples of means for performing operations (502-508) may comprise, for example, the processor 106 which may be implemented in the system and/or a device or circuit for executing instructions or executing an algorithm for processing information as described above.

Figure 6:
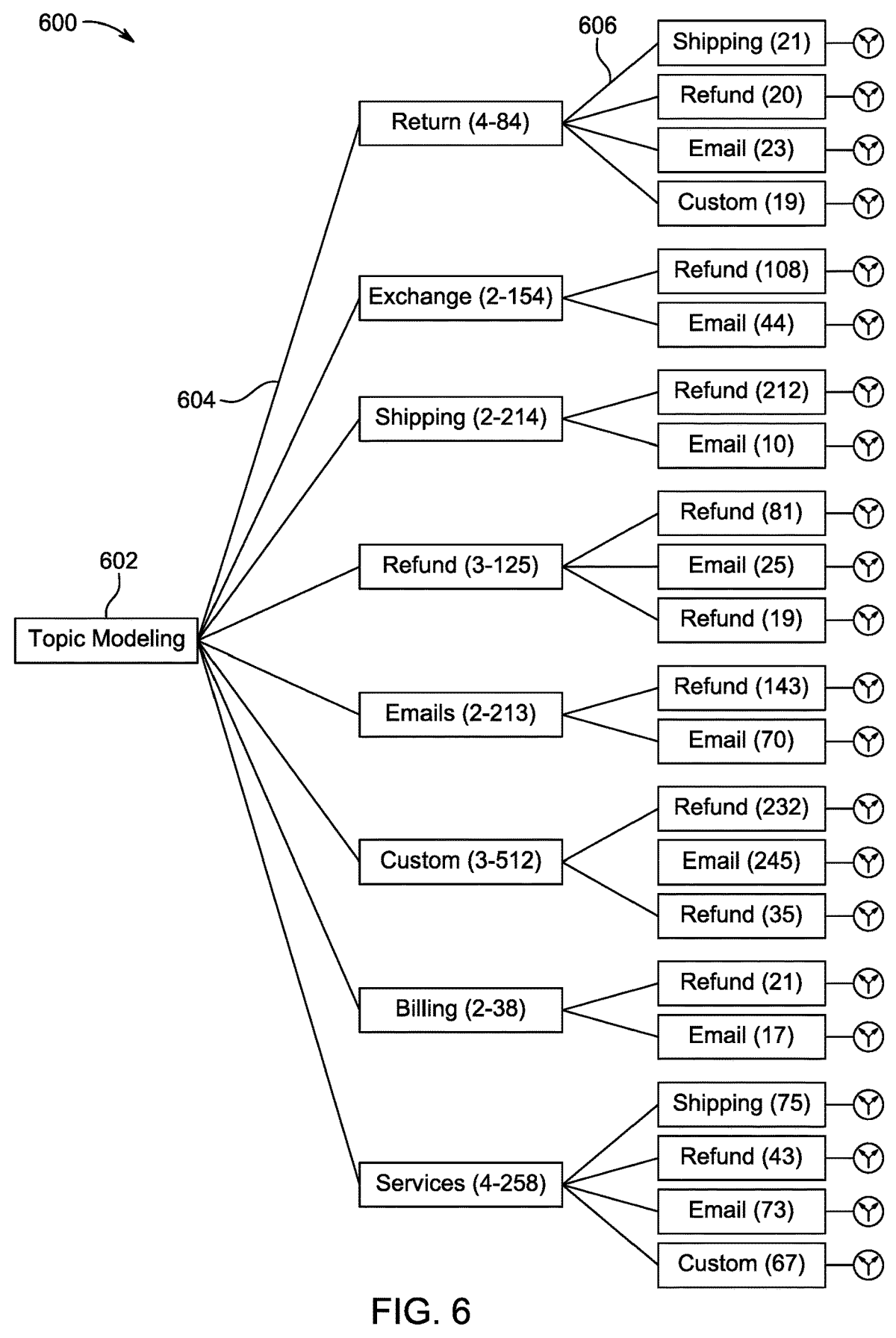

FIG. 6 illustrates an exemplary block diagram for classifying topics into main topic and sub-topics, in accordance with an example embodiment. The present FIG. 6 illustrates an exemplary scenario 600 of an E-commerce conversation log just for the sake of explaining the topic modeling process. The identified main topics and sub-topics mentioned in this example, such as "Return," "Exchange," "Shipping," "Refund," "Custom," "Emails," "Billing," and "Services," are commonly associated with E-commerce transactions and customer interactions in an E-commerce setting. However, it should be noted that the topic modeling process disclosed in one or more embodiments of the present disclosure may be applied to various domains and is not limited to E-commerce alone. The specific topics and sub-topics extracted may depend on the nature and content of the conversation logs being analysed.

With reference to present FIG. 6, a topic modeling technique may be employed to classify the conversation topics into main topics 404 and sub-topics 406. The block labeled as "Topic Modeling 602" represents an initial step of the topic modeling process. This block takes the conversation logs as input and applies topic modeling techniques to identify the main topics discussed in the conversations.

The topic modelling process may use a tree data structure model, to create a hierarchical structure for the main topics and sub-topics, as shown in present FIG. 6. By representing the conversation topics as a tree data structure, the relationships and hierarchy between the main topics and sub-topics are captured. This enables a more organized and structured representation of the conversation content, allowing for efficient analysis, and understanding of the topics within the conversations.

From the "Topic Modeling 602" block, multiple arrows emerge, each representing a distinct main topic 404 that has been identified. These arrow blocks signify the main topics 604 extracted from the conversation logs. For example, the first arrow block indicates the main topic "Return (4-84)", the second arrow block indicates "Exchange (2-154)", the third arrow block indicates "Shipping (2-214)", and so on.

Each arrow block representing the main topics 604, may be further classified into sub-topics 606. The sub-topics 406 may provide more granular categorization of the conversation content. In the present FIG. 6, each arrow block representing the main topics 604 is connected to at least two additional blocks, indicating the sub-topics 406 associated with that main topic.

For example, the "Return (4-84)" main topic, is further divided into three sub-blocks: "Shipping (21)", "Refund (20)", and "Custom (19)". Similarly, the "Exchange (2-154)" main topic is divided into two sub-blocks: "Refund (108)" and "Email (44)", and so on. The exemplary scenario 400 shows how the present disclosure utilizes topic modeling to classify conversation topics into main topics and sub-topics. This classification helps in organizing and structuring the conversation data, facilitating the generation of accurate and meaningful conversation flows for virtual agents.

Figure 7:
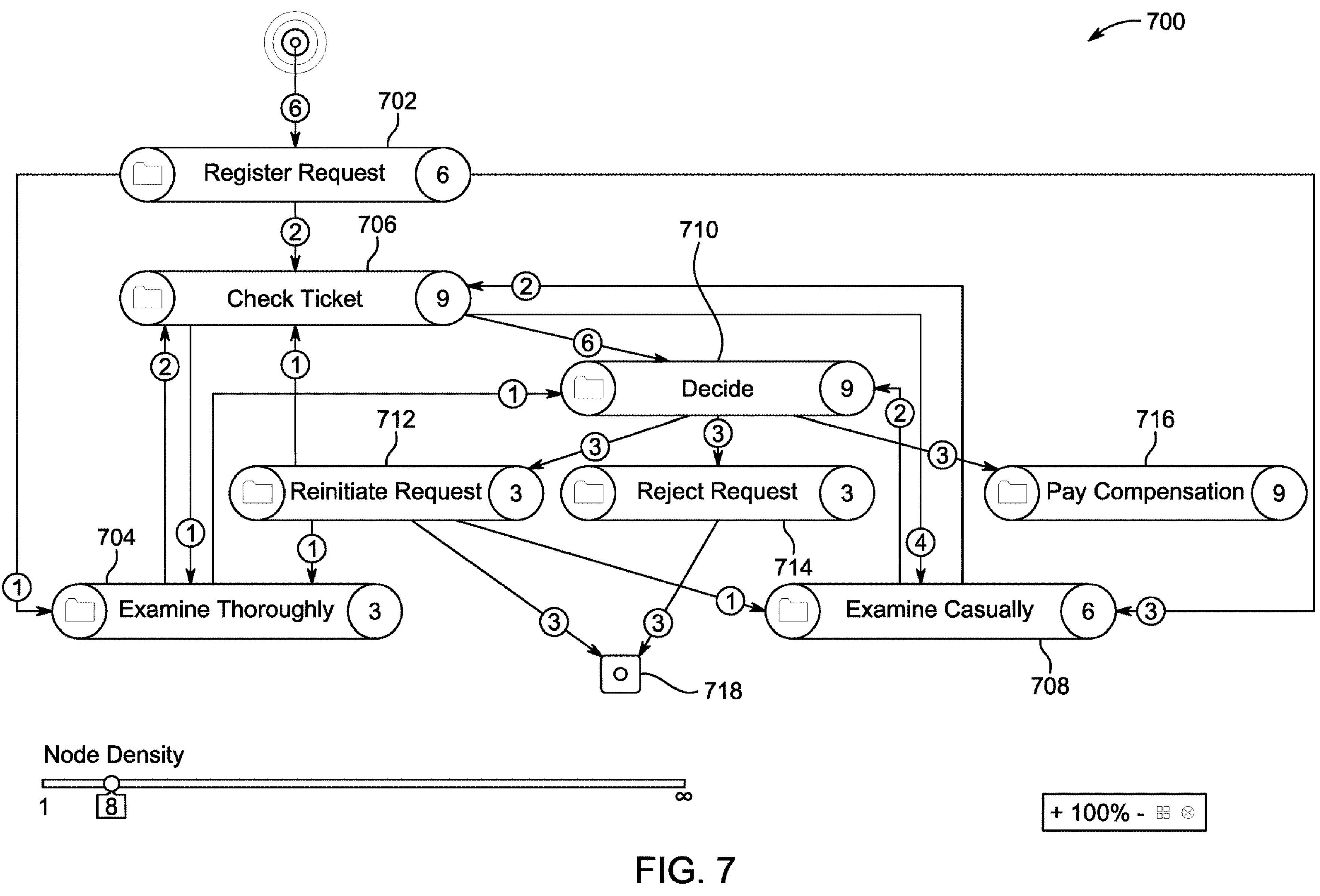
FIG. 7 illustrates an exemplary block diagram of a conversation flows generated from main topic and sub-topics, in accordance with an example embodiment.

FIG. 7 illustrates an exemplary block diagram of conversation flows generated from main topic and sub-topics, in accordance with an example embodiment. The conversation flows are represented as a directed cyclic graph, indicating possible paths of interaction between the agent and the user. The directed cyclic graph includes multiple nodes and edges. Each node represents a specific block or step in the conversation flow. The nodes correspond to different actions or decision points taken by the agent during the interaction with the user. The nodes may be, for example, "Register Request (6)", "Examine Thoroughly (3)", "Check Ticket (9)", "Examine Casually (9)", "Decide (9)", "Reinitiate Request (3)", "Reject Request (3)", and "Pay Compensation (3)". The edges in the directed cyclic graph represent the possible paths or transitions between the nodes. Each edge indicates a potential flow of conversation from one block to another. The edges are labeled with numbers to indicate the flow sequence. For example, arrow 1 represents a flow from one block to another, arrow 2 represents another flow from one block to another, and arrow 3 represents yet another flow from one block to another.

The present FIG. 7 illustrates an exemplary scenario 700 for a possible conversation flow in which a user initiates a request, which is registered. The agent then proceeds to examine the request either thoroughly or casually. Based on the examination, various actions are taken, for example, checking the ticket, making decision, reinitiating the request, rejecting the request, or providing compensation.

The conversation flows may start with a block labeled as "Register Request (6)" node 702. From the block "Register Request (6)" node 702 multiple arrows emerge. Each arrow represents a possible flow of conversation. For example, arrow 1 leads to the block "Examine Thoroughly (3)" node 704, arrow 2 leads to "Check Ticket (9)" node 706, and arrow 3 leads to "Examine Casually (9)" node 708. Further, from the "Check Ticket (9)" node 706, multiple arrows emerge. For example, arrow 1 goes back to "Examine Thoroughly (3)" node 704, arrow 4 leads to "Examine Casually (9)" node 708, and arrow 6 leads to "Decide (9)" node 710. Further, the "Decide (9)" node 710 has three outgoing arrows. For example, arrow 3 leads to "Reinitiate Request (3)" node 712, arrow 3 leads to "Reject Request (3)" node 714, and arrow 3 leads to "Pay Compensation (3)" node 716. Further, from the "Reinitiate Request (3)" node 712, three arrows emerge. For example, arrow 1 leads to "Examine Thoroughly (3)" node 704, arrow 3 leads to a termination node 718, and arrow 1 leads to "Examine Casually (9)" node 708. Further, arrow 3 emerges from the "Reject Request (3)" node 514, leading to the termination node 718. Two arrows emerge from the "Examine Thoroughly (3)" node 704. Arrow 1 goes to "Decide (9)" node 710, and arrow 2 goes to "Check Ticket (9)" node 706. Two arrows also emerge from the "Examine Casually (9) node 708" block. Arrow 2 goes to "Check Ticket (9)" node 706, and arrow 2 goes to "Decide (9)" node 710.

By way of an example, a conversation between a user and an agent based on the directed cyclic graph represented in the exemplary block diagram of FIG. 7 may be as follows:

User: "I would like to register a request".

Agent: "Sure, let's start by registering your request".

User: "Please examine my request thoroughly".

Agent: "I will thoroughly examine your request".

User: "Also, please check my ticket status".

Agent: "I will check the status of your ticket".

User: "Okay, after examining it thoroughly, please make a decision".

Agent: "Once I have thoroughly examined your request, I will make a decision".

User: "If necessary, please reinitiate the request".

Agent: "If needed, I can reinitiate the request for further processing".

User: "If my request is not feasible, please reject it".

Agent: "If your request cannot be accommodated, I will reject it".

User: "If applicable, please provide compensation".

Agent: "If compensation is appropriate, I will provide it".

It should be noted that the exemplary scenario 700 presented in FIG. 7 is just one instance of how the conversation flow graph can be generated. This scenario may vary depending on the nature of the conversation logs and the identified main topics and sub-topics within the domain of the present disclosure.

As will be appreciated by those skilled in the art, the techniques described in the various embodiments discussed above are not routine, or conventional, or well understood in the art. The present disclosure addresses the problem of deriving conversation flow designs from text transcripts of conversation logs between users and human agents. This may be achieved by employing topic modeling to identify topics and sub-topics, assigning generic names to the topic clusters as intent name suggestions, and utilizing process mining techniques to generate directed cyclic conversation flow patterns based on the dataset. These conversation flow patterns may then be used as a starting point for developing an effective virtual agent.

The process of generating conversation flows may start by analyzing the text transcripts of conversation logs between the user and human agent. This analysis may be useful in understanding the content and structure of the conversations. Further, the topic modeling techniques may be applied to the text transcripts to identify main topics and sub-topics discussed within the conversations. Once the topic clusters are identified, the next step is to curate them and assign a generic name to each cluster. These generic names may act as possible intent name suggestions, representing the intentions or purposes behind user queries related to those topics. After determining the topic clusters and assigning intent names, the process mining techniques may be applied to the conversation log data. By employing the process mining techniques, a directed cyclic graph representation may be generated. This representation may act as a recommendation for a conversation flow design during the development of the virtual agent.

The techniques discussed above provide advantages like, it automates entirely manual process and reduces considerable manual hours spent by developers on manually identifying main topics and sub-topics in the given text transcript, and manually identifying and designing the flow paths that exist in the identified topics. Due to its automated nature, the aforementioned technique may be seamlessly integrated into a larger processing pipeline.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

It is to be understood that the above description is intended to be illustrative, and not restrictive. For example, the above-discussed embodiments may be used in combination with each other. Many other embodiments will be apparent to those of skill in the art upon reviewing the above description.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the embodiments.

While the present invention has been described with reference to particular embodiments, it should be understood that the embodiments are illustrative and that the scope of the invention is not limited to these embodiments. Many variations, modifications, additions, and improvements to the embodiments described above are possible. It is contemplated that these variations, modifications, additions, and improvements fall within the scope of the invention.

What is claimed is:

1. A computer-implemented method for generating conversation flows, comprising:

storing conversations between at least an agent and at least a user in logs;

transforming the stored logs into text transcripts;

extracting topics from the text transcripts of the stored logs using a natural language processing (NLP) model;

creating topic clusters from the extracted topics using a topic modeling technique to group semantically similar topics identified across consecutive conversation turns of the stored logs, and assigning intent names to the topic clusters, the intent names representing intentions of user queries associated with the topic clusters, wherein the topic clusters include main topics and sub-topics based on a hierarchical relationship among the topics, each main topic being associated with at least two sub-topics;

generating the conversation flows, modeled as a graph, from the topic clusters, wherein the generating includes applying a process mining technique to the topic clusters to determine patterns, dependencies, and relationships among the topic clusters, and wherein the graph comprises nodes representing specific topics, and edges representing transitions between the nodes based on the determined patterns, dependencies, and relationships;

identifying anomalous conversation patterns based on the conversation flows; and configuring operation of a virtual agent based on the identified anomalous conversation patterns and the conversation flow.

2. The computer-implemented method of claim 1, wherein the graph is a directed cyclic graph.

3. The computer-implemented method of claim 1, wherein the sub-topics and the main topics are modeled as a tree.

4. The computer-implemented method of claim 1, wherein the agent is a human agent.

5. A computer system for generating conversation flows, the computer system comprising:

one or more computer processors, one or more computer readable memories, one or more computer readable storage devices, and program instructions stored on the one or more computer readable storage devices for execution by the one or more computer processors via the one or more computer readable memories, the program instructions comprising:

storing conversations between at least an agent and at least a user in logs;

transforming the stored logs into text transcripts;

extracting topics from the text transcripts of the stored logs using a natural language processing (NLP) model;

creating topic clusters from the extracted topics using a topic modeling technique to group semantically similar topics identified across consecutive conversation turns of the stored logs, and assigning intent names to the topic clusters, the intent names representing intentions of user queries associated with the topic clusters, wherein the topic clusters include main topics and sub-topics based on a hierarchical relationship among the topics, each main topic being associated with at least two sub-topics;

generating the conversation flows, modeled as a graph, from the topic clusters, wherein the generating includes applying a process mining technique to the topic clusters to determine patterns, dependencies, and relationships among the topic clusters, and wherein the graph comprises nodes representing specific topics, and edges representing transitions between the nodes based on the determined patterns, dependencies, and relationships;

identifying anomalous conversation patterns based on the conversation flows; and configuring operation of a virtual agent based on the identified anomalous conversation pattern.

6. The computer system of claim 5, wherein the graph is a directed cyclic graph.

7. The computer system of claim 5, wherein the sub-topics and the main topics are modeled as a tree.

8. The computer system of claim 5, wherein the agent is a human agent.

9. A non-transitory computer-readable storage medium having stored thereon computer executable instructions which, when executed by one or more processors, cause the one or more processors to carry out operations for generating conversation flows, the operations comprising:

storing conversations between at least an agent and at least a user in logs;

transforming the stored logs into text transcripts;

extracting topics from the text transcripts of the stored logs using a natural language processing (NLP) model;

creating topic clusters from the extracted topics using a topic modeling technique to group semantically similar topics identified across consecutive conversation turns of the stored logs, and assigning intent names to the topic clusters, the intent names representing intentions of user queries associated with the topic clusters, wherein the topic clusters include main topics and sub-topics based on a hierarchical relationship among the topics, each main topic being associated with at least two sub-topics;

generating the conversation flows, modeled as a graph, from the topic clusters, wherein the generating includes applying a process mining technique to the topic clusters to determine patterns, dependencies, and relationships among the topic clusters, and wherein the graph comprises nodes representing specific topics, and edges representing transitions between the nodes based on the determined patterns, dependencies, and relationships;

identifying anomalous conversation patterns based on the conversation flows; and configuring operation of a virtual agent based on the identified anomalous conversation pattern.

* * * * *